A. WEFING.
STUFFING BOX FOR GAS ENGINES.
APPLICATION FILED AUG. 12, 1908.
904,386.
Patented Nov. 17, 1908.
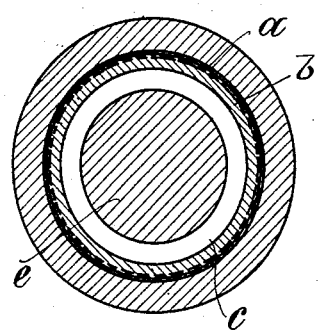
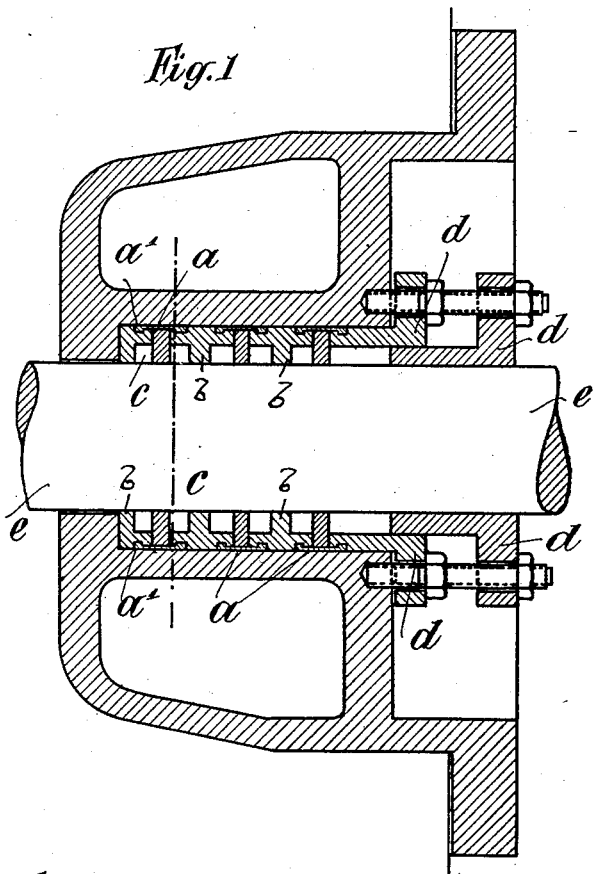
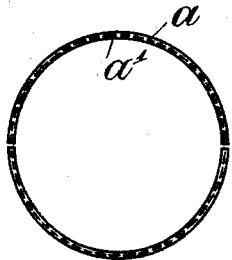
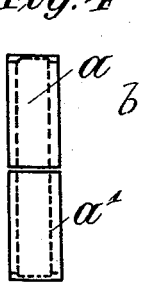
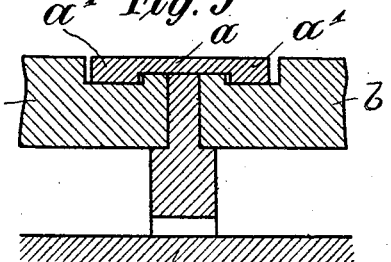

UNITED STATES PATENT OFFICE.

ADOLF WEFING, OF MALSTATT-BURBACH, GERMANY, ASSIGNOR TO EHRHARDT & SEHMER, GESELLSCHAFT MIT BESCHRÄNKTER HAFTPFLICHT, OF SCHLEIFMÜHLE, NEAR SAARBRÜCKEN, GERMANY.

STUFFING-BOX FOR GAS-ENGINES.

No. 904,386.  Specification of Letters Patent.  Patented Nov. 17, 1908.

Application filed August 12, 1908.  Serial No. 448,230.

*To all whom it may concern:*

Be it known that I, ADOLF WEFING, engineer, a subject of Prussia, and residing at Malstatt-Burbach, Germany, have invented certain new and useful Improvements in Stuffing-Boxes for Gas-Engines, of which the following is a specification.

In the construction of stuffing boxes for piston rods, the packing of which is located in several angular chambers of a rectangular cross-sectional area, it is old to connect the chambers by screwing them together in order to permit the taking out of the entire series of packing rings as a single body. This type of stuffing box has the disadvantage that it is longer by the sum of the lengths of the threaded parts of the individual chambers or rings, and moreover it is always difficult and in some cases even impossible to screw apart the ring sections because of the fact that the lubricating oil becomes resinous through the medium of high temperature and thus cements the rings together.

The present invention has for its object the avoidance of the above objections and it consists of certain novel features of construction hereinafter particularly pointed out in the appended claims.

In the accompanying drawings, Figure 1 is a vertical sectional view of a stuffing box of well-known construction provided with my invention; Fig. 2 is a transverse section thereof; Figs. 3 and 4 detail views of the divided lock-ring and, Fig. 5 is a detail cross-section of the packing rings enlarged.

Referring to the drawing by reference characters, $b$ are the individual packing-carrying rings which are arranged adjacent to each other and nicely fit within the usual stuffing-box chamber $c$ formed in the cylinder head and which are held in place in said chamber around the piston rod $e$ by means of the usual gland members $d$. These packing rings are adapted to contain the usual lubricating packing. Spanning the joint between each adjacent pair of these rings is a ring $a$ which is made in two sections and is let into annular grooves in the packing rings so that its periphery shall be flush with the periphery of said packing rings and so that it shall be held in engagement with the packing rings by the wall of the chamber $c$. The rings $a$ are provided at the inner corners of their edges with inwardly extending annular flanges $a'$ and the grooves in the packing rings are deepened to receive these flanges, so that the adjacent rings are thus interlocked in such manner that the entire series of packing rings may be withdrawn from the chamber $c$ in a body.

It will be observed that the ring $a$ nearest the gland end of the box engages in the periphery of the gland member in the same manner that it engages in the adjacent packing ring thus interlocking that ring with the gland ring so that by withdrawing the gland member the entire series of packing rings is withdrawn at the same time. It will also be observed that by constructing the lock rings in the manner set forth I avoid increasing the diameter of the packing rings and the stuffing box.

Having thus fully described my invention, what I claim as new, and desire to secure by Letters Patent, is:—

1. In combination, a stuffing-box chamber, a series of adjacent packing rings therein, a gland member adapted to hold the rings in position, the gland member and also the rings being provided exteriorly with grooves deepened at their inner edges, and sectional lock rings fitting in said grooves and provided with inwardly-extending lock flanges, for the purpose set forth.

2. In a packing-box, a series of adjacently arranged packing rings each having an exterior annular groove near its edge, said groove being deepened at a point inside the edge, a series of sectional lock-rings fitting in said grooves and held in place by the inner wall of the stuffing box, for the purpose set forth.

3. In a stuffing-box, a series of packing rings adjacently arranged, and means for interlocking said rings with each other, said means consisting of sectional members spanning the joints between the rings and held in engagement therewith by the wall of the packing box and provided with inwardly extending parts engaging shoulders on said packing rings.

In witness whereof I have hereunto set my hand in presence of two witnesses.

ADOLF WEFING.

Witnesses:
JEAN GRUND,
CARL GRUND.